United States Patent
Blumenstock et al.

[11] Patent Number: 5,339,788
[45] Date of Patent: Aug. 23, 1994

[54] METHOD AND ARRANGEMENT FOR CONDUCTING A TANK-VENTING DIAGNOSIS IN A MOTOR VEHICLE

[75] Inventors: Andreas Blumenstock, Ludwigsburg; Helmut Denz, Stuttgart, both of Fed. Rep. of Germany

[73] Assignee: Robert Bosch GmbH, Stuttgart

[21] Appl. No.: 60,036

[22] Filed: May 11, 1993

[30] Foreign Application Priority Data

May 15, 1992 [DE] Fed. Rep. of Germany ........ 4216067

[51] Int. Cl.$^5$ ...................... F02M 33/02; F02B 77/00
[52] U.S. Cl. .................... 123/520; 123/198 D
[58] Field of Search ............... 123/520, 519, 518, 516, 123/521, 198 D

[56] References Cited

U.S. PATENT DOCUMENTS

| | | | |
|---|---|---|---|
| 4,949,695 | 8/1990 | Uranishi | 123/198 D |
| 4,962,744 | 10/1990 | Uranishi et al. | |
| 5,186,153 | 2/1993 | Steinbrenner et al. | 123/520 |
| 5,193,512 | 3/1993 | Steinbrenner et al. | |
| 5,220,896 | 6/1993 | Blumenstock | 123/198 D |
| 5,230,319 | 7/1993 | Otsuka | 123/520 |

FOREIGN PATENT DOCUMENTS

| | | | |
|---|---|---|---|
| 0029761 | 2/1984 | Japan | 123/520 |
| 0012062 | 1/1989 | Japan | 123/520 |

Primary Examiner—Carl S. Miller
Attorney, Agent, or Firm—Walter Ottesen

[57] ABSTRACT

The invention is directed to a method and an arrangement for making a tank-venting diagnosis for a motor vehicle. The underpressure in a tank-venting apparatus is measured and tank venting is inhibited when a determination is made that a test condition is satisfied according to which a check is made as to whether a threshold underpressure is exceeded during a tank-venting phase. The method ensures that a tank-venting apparatus will not be damaged by an underpressure which is too high and which can occur when the venting arrangement of the adsorption filter of the apparatus is blocked or when a shutoff valve of the venting arrangement no longer opens.

5 Claims, 2 Drawing Sheets

METHOD AND ARRANGEMENT FOR CONDUCTING A TANK-VENTING DIAGNOSIS IN A MOTOR VEHICLE

FIELD OF THE INVENTION

The invention relates to a method and an arrangement for conducting a tank-venting diagnosis in a motor vehicle having a tank-venting apparatus.

BACKGROUND OF THE INVENTION

In the following, reference will often be made to the magnitude of an underpressure in the tank-venting apparatus. In this context a "higher" underpressure means an underpressure of a high amount. Correspondingly, a threshold underpressure is exceeded by an actual underpressure when the amount of the actual underpressure is greater than the amount of the threshold underpressure.

An arrangement for conducting a tank-venting diagnosis is described in U.S. Pat. No. 4,962,744. This arrangement uses a temperature sensor in the adsorption filter of the tank-venting apparatus. The temperature of adsorbent material increases with an adsorption of fuel whereas, the temperature drops for a desorption of fuel. These temperature changes can be determined with the aid of the temperature sensor. Temperature changes are, however, also caused by fuel vapors which have a temperature different than the adsorbent material. For this reason, a definite decision cannot always be made as to whether the particular temperature change is caused by proper operation of the adsorption filter or by a disturbance effect. However, to nonetheless arrive at a reliable statement, U.S. Pat. No. 4,962,744 teaches that measurements are to take place only during a tanking operation and directly after such a tanking operation. Then, for a properly operating tank-venting apparatus, especially intense and therefore especially pronounced temperature changes can be expected.

U.S. Pat. No. 5,193,512 teaches that the pressure in the tank-venting apparatus is to be monitored for checking the operability of a tank-venting apparatus not only in direct association with tanking operations. As soon as a tank-venting valve is opened, the underpressure in the apparatus should increase whereas, the pressure should again decrease when this valve is closed. This patent discloses a tank-venting apparatus having a controllable shutoff valve in the venting line of the adsorption filter in order to obtain a relatively large measuring effect. This shutoff valve is closed for the tank-venting diagnosis so that an underpressure effect is obtained as rapidly as possible and which is clearly recognizable; whereas, the shutoff valve is opened when the adsorption filter is to be regenerated.

The shutoff valve described in U.S. Pat. No. 5,193,512 advantageously includes an underpressure protective valve so that an underpressure cannot build up which is too great and which could lead to damage of the tank-venting apparatus in the event that there is a defect of the shutoff valve.

The above-cited detail solution indicates that operational safety is pertinent in the arrangements and methods for conducting a tank-venting diagnosis.

SUMMARY OF THE INVENTION

In the method of the invention for conducting a tank-venting diagnosis for a motor vehicle, tank venting is inhibited when there is a determination that an underpressure occurs in the tank-venting apparatus during a tank-venting phase which underpressure exceeds a threshold underpressure. The arrangement of the invention includes a sequence control/diagnostic unit for carrying out the method of the invention.

The method of the invention is based upon the recognition that an underpressure can develop when there is a blockage of the adsorption filter or when there is a blockage or inoperability of the shutoff element (shutoff valve or throttle) in the venting line of the adsorption filter, this underpressure being such that there is a danger that the tank-venting apparatus cannot operate and especially that a danger is present for the fuel tank.

The invention is also based on the recognition that this danger to a tank-venting apparatus can be detected by an underpressure sensor directly from the value of the signal emitted thereby.

The tank-venting apparatus can be protected against damage by underpressure with the aid of the method of the invention without it being necessary to provide an underpressure protective valve on the apparatus.

A tank-venting diagnostic system indicates when a tank-venting apparatus is no longer completely operable because of a blockage or because of a leak or valve defect provided that the diagnostic system operates reliably. Even for an apparatus which is not fully operable, it is however, in general, an advantage to continue tank venting in order to draw off by suction at least a part of the fuel vapors which are produced. This operation is however inhibited by the invention as soon as it is established that an underpressure develops in the apparatus which is too high.

The inhibit to continue with tank venting can be related only to the actual tank-venting phase or can be permanent. If only a blockage is present, then it is purposeful to intermittently draw off some gas by suction from the tank-venting apparatus but only until the actual underpressure exceeds the threshold underpressure. The threshold underpressure is selected relatively high, for example, at approximately 70 to 80 hPa (mbar), compared to values of typically 10 to 20 hPa for the diagnosis of the system so that a tank-venting operation is only then interrupted when this is actually necessary. If the relatively high threshold underpressure is intermittently approached, an intense alternate loading of the tank-venting apparatus occurs whereby the apparatus can be destroyed when continuously loaded. For this reason, it is advantageous to inhibit the tank venting permanently when, at the latest, the check was satisfied a pregiven number of times.

It is advantageous to compare the mean underpressure to the threshold underpressure in order to prevent an unnecessary tank-venting inhibit when the threshold underpressure is exceeded for a short time.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
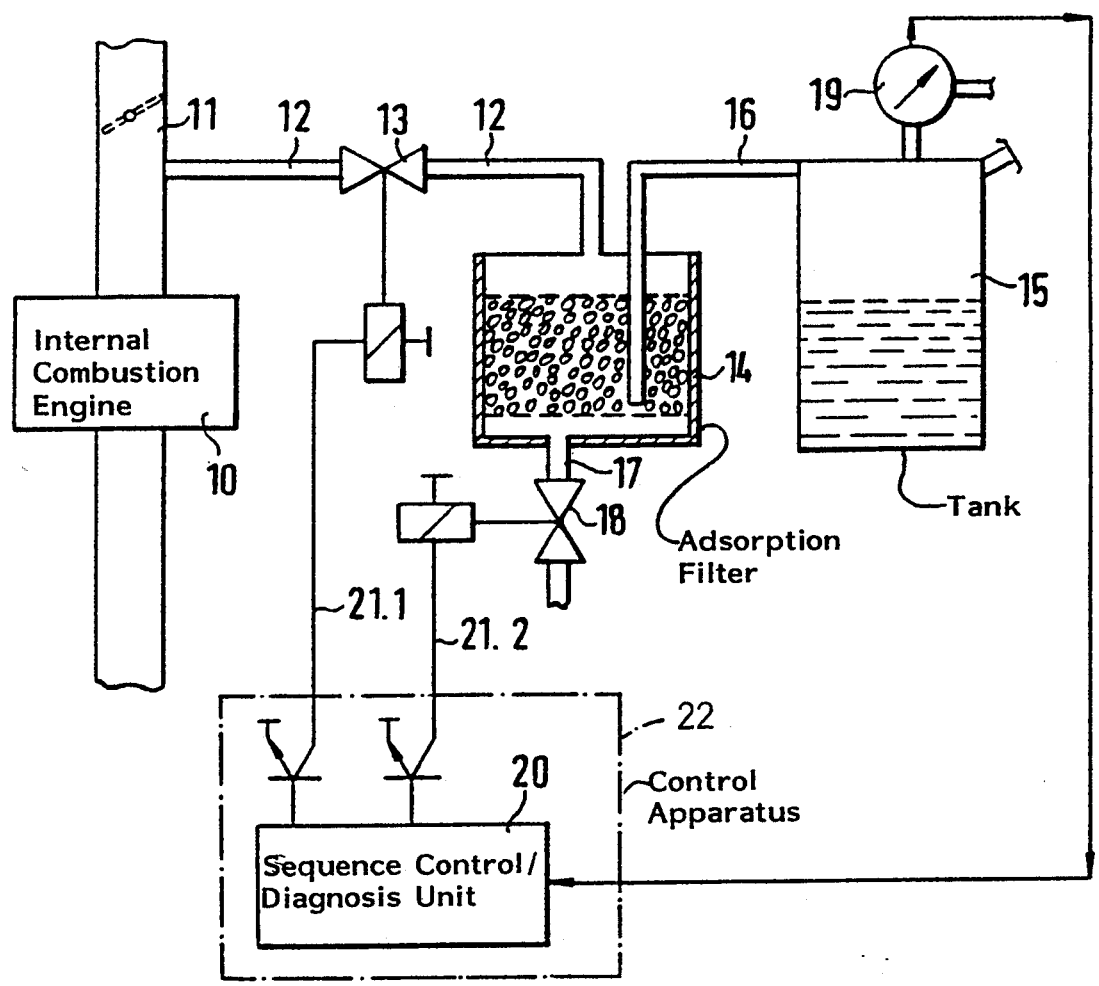
FIG. 1 is a schematic block diagram of a tank-venting diagnostic system according to the invention; and, FIG. 2 is a flowchart for the system shown in FIG. 1.

The tank-venting apparatus shown in FIG. 1 is arranged on an internal combustion engine 10 having an intake pipe 11. The tank-venting apparatus includes a connecting line 12 having a tank-venting valve 13 disposed between the intake pipe 11 and an adsorption filter 14 as well as a supply line 16 leading from the adsorption filter 14 to a tank 15. A venting line 17 opens into the adsorption filter 14 at the venting end of the filter. A shutoff valve 18 is disposed in the venting line 17. A pressure-difference sensor 19 is connected to the tank 15 and this sensor measures the pressure difference between the internal pressure of the tank and the ambient pressure.

The block diagram of FIG. 1 also shows a control apparatus 22 having a sequence control/diagnosis unit 20. The unit 20 receives the signal from the pressure-difference sensor 19 and emits signals for controlling the tank-venting valve 13 and the shutoff valve 18 via control lines 21.1 and 21.2, respectively.

The sequence control/diagnostic unit 20 ensures that so-called basic adaptation phases and tank-venting phases alternate with each other and that a diagnosis of the tank-venting apparatus takes place during the tank-venting phases to determine if the tank-venting apparatus is still completely operable. Basic adaptation phases are such phases for which the tank-venting valve 13 is closed and an air/fuel closed-loop control unit (not shown) carries out a learning operation.

Figure 2:
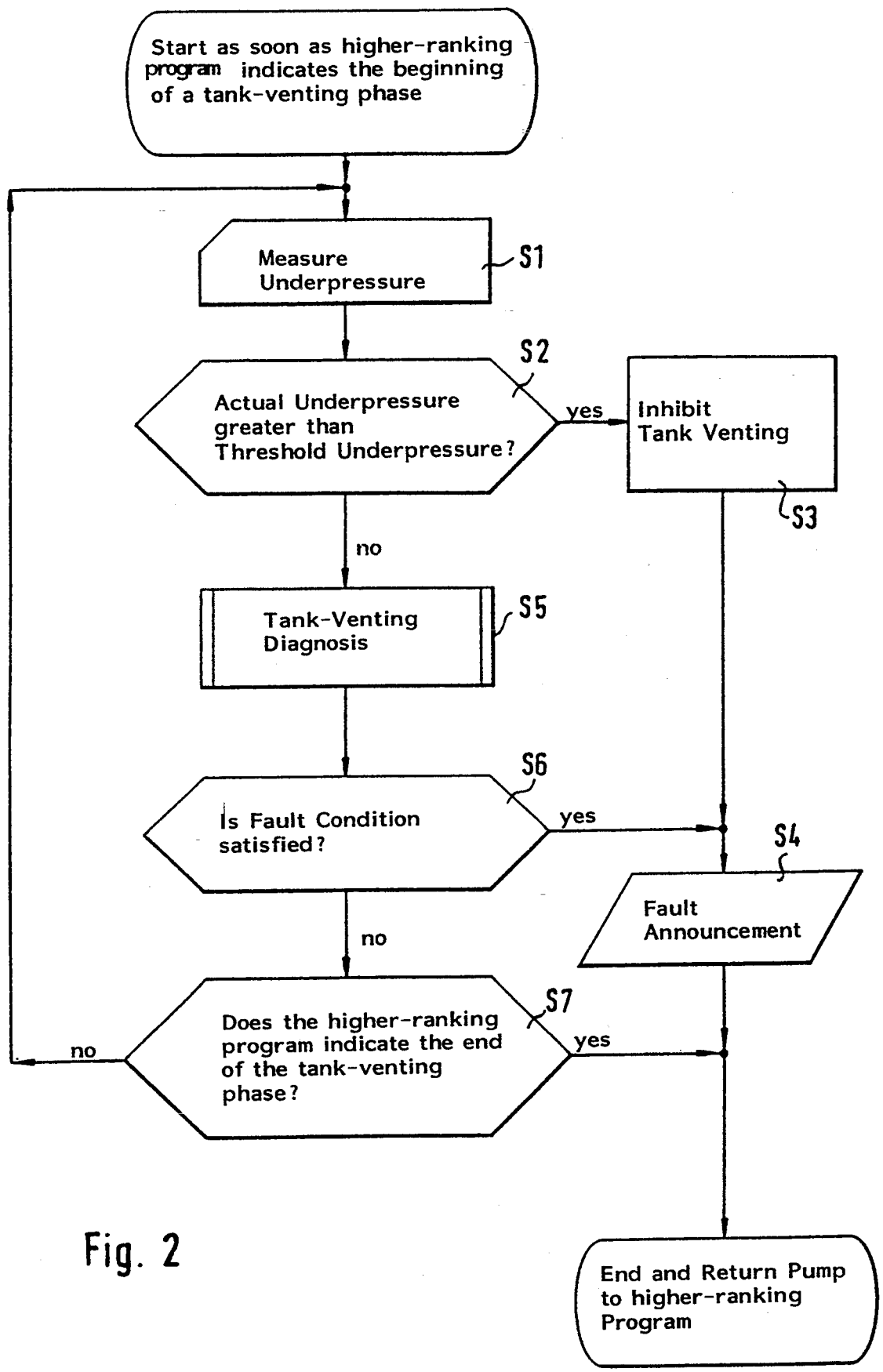

The sequence control/diagnostic unit 20 carries out a sequence for diagnosis as shown in FIG. 2 and explained below.

The sequence of FIG. 2 is started as soon as a higher-ranking program, here the sequence control, indicates the start of a tank-venting phase. In step s1, the underpressure value supplied by the pressure-difference sensor 19 is detected and a check is made in step s2 as to whether this actual underpressure lies above a pregiven threshold underpressure. The threshold underpressure typically lies between 50 and 70 hPa and is dependent upon the entire configuration of the tank-venting apparatus and especially the underpressure tightness of the tank 15. When the underpressure exceeds the threshold underpressure, then the tank venting is inhibited in step s3; that is, the tank-venting valve 13 is closed. Furthermore, a fault announcement is emitted in step s4.

It is advantageous to not directly compare the measured underpressure to the threshold underpressure in step s2, but instead to average the measured underpressure before the comparison to the threshold underpressure. In this way, short-term disturbances of the underpressure measurement then do not cause the tank venting to be inhibited even though this is not actually required.

The inhibit of tank venting in step s3 can take place in different ways. The simplest possibility is that the tank venting is inhibited only for the actual tank-venting phase; that is, to close the tank-venting valve 13 and to end the tank-venting phase. The next tank-venting phase is reached after a base adaptation phase has run. In this next tank-venting phase, an underpressure again builds up until the threshold underpressure is reached whereupon the described cycle is again run through. For a blocked adsorption filter 14 or for a blocked venting line 17 or blocked shutoff valve 18, this procedure affords the advantage that regeneration can take place at least intermittently. In this context, it is noted that the described sequence does not premise a tank-venting apparatus having a shutoff valve 18. However, for such a tank-venting apparatus, the danger is increased of a poorer venting of the adsorption material compared to the case of an apparatus without such a valve.

By proceeding in the manner described above, the tank is charged with a pressure up to the threshold underpressure at intervals of a few minutes. If the operator of a vehicle does not cause the tank-venting apparatus to be repaired notwithstanding an indicated fault therein, then an alternating loading of the tank develops, which can reduce the resistance against pressure loadings whereby the tank finally can be damaged when the threshold underpressure is reached. To prevent this, it is advantageous to count how often the threshold underpressure is reached and to limit this number, for example, to several hundred times. Tank venting is permanently inhibited when the set number is reached. If the above counting operation is to be avoided or if a tank-venting apparatus is especially sensitive to continuous pressure changes, then the tank venting can be inhibited permanently in step s3 when the threshold underpressure is reached for the first time. For this purpose, a flag is set, for example, which shows that the tank venting is inhibited. The flag is only reset in the service station when the tank-venting apparatus is repaired.

The steps s1 to s4 in the flowchart of FIG. 2 are essential for the system according to the invention. Further steps s5 to s7 are only mentioned for the sake of completeness.

If in step s2 the underpressure does not exceed the threshold underpressure, then a tank-venting diagnosis takes place in a subprogram step s5. For this diagnosis, a method can be used, for example, as described in U.S. Pat. No. 5,193,512 referred to above. If it develops that a fault is present when a subsequent check as to a fault condition is made (step s6), then the fault announcement step s4 is reached. Otherwise, a step s7 follows wherein a check is made as to whether the higher-ranking program shows the end of the tank-venting phase. If this is not the case, then step s1 is again reached; otherwise, the sequence of FIG. 2 is ended and a jump to the higher-ranking program takes place in the same manner as subsequent to the fault announcement step s4.

It is understood that the foregoing description is that of the preferred embodiments of the invention and that various changes and modifications may be made thereto without departing from the spirit and scope of the invention as defined in the appended claims.

What is claimed is:

1. An arrangement for conducting a tank-venting diagnosis for a motor vehicle equipped with a tank-venting apparatus having a tank-venting valve actuated by an actuator between an open position and a closed position, the arrangement comprising:

pressure-difference sensor means for measuring the underpressure in the tank-venting apparatus;

control means including a sequence control/diagnosis unit connected to said pressure-difference sensor for receiving a signal indicative of the measured underpressure;

said sequence control/diagnosis unit being adapted to determine when said measured underpressure exceeds a threshold underpressure and to emit a signal to said actuator for closing said tank-venting valve and maintaining said tank-venting valve closed when said measured underpressure exceeds said threshold underpressure during a tank-venting phase thereby protecting said tank-venting apparatus against damage from an underpressure greater than said threshold underpressure.

2. A method for conducting a tank-venting diagnosis in a motor vehicle having a tank-venting apparatus, the method comprising the steps of:

measuring the underpressure in the tank-venting apparatus;

determining if a test condition is satisfied by checking if the measured underpressure exceeds a threshold underpressure during a tank-venting phase; and, if so, then inhibiting tank venting thereby protecting the tank-venting apparatus against damage from an underpressure greater than said threshold underpressure.

3. The method of claim 2, further comprising the steps of: averaging measured values of underpressure in the tank-venting apparatus to form a mean value; and, comparing said mean value to said threshold underpressure.

4. The method of claim 2, further comprising the step of permanently inhibiting tank venting when the determination is made that said test condition is satisfied.

5. The method of claim 2, further comprising the step of permanently inhibiting tank venting when the determination is made that said test condition is satisfied a pregiven number of times.

* * * * *